United States Patent
Oishi

(10) Patent No.: US 7,689,045 B2
(45) Date of Patent: Mar. 30, 2010

(54) IMAGE CAPTURE APPARATUS

(75) Inventor: Akihiro Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1120 days.

(21) Appl. No.: 10/865,156

(22) Filed: Jun. 9, 2004

(65) Prior Publication Data

US 2004/0252771 A1  Dec. 16, 2004

(30) Foreign Application Priority Data

Jun. 13, 2003  (JP) ............................. 2003-169192

(51) Int. Cl.
H04N 11/04 (2006.01)
(52) U.S. Cl. .................. 382/232; 348/222.1; 348/441
(58) Field of Classification Search ......... 375/240–241; 382/232–253; 348/222.1–261, 441–459
See application file for complete search history.

(56) References Cited

U.S. PATENT DOCUMENTS

| | | | |
|---|---|---|---|
| 6,211,800 B1 * | 4/2001 | Yanagihara et al. ........... 341/50 |
| 6,744,927 B1 * | 6/2004 | Kato ........................... 382/239 |
| 6,801,544 B1 * | 10/2004 | Rijckaert et al. .............. 370/473 |
| 6,868,125 B2 * | 3/2005 | Gendel .................... 375/240.26 |
| 6,873,629 B2 * | 3/2005 | Morris ........................ 370/535 |
| 6,901,078 B2 * | 5/2005 | Morris ........................ 370/466 |
| 6,909,747 B2 * | 6/2005 | Bordes et al. ........... 375/240.12 |
| 7,030,910 B2 | 4/2006 | Ishizaka et al. |
| 7,065,213 B2 * | 6/2006 | Pinder ........................ 380/240 |
| 7,069,579 B2 * | 6/2006 | Delpuch ..................... 725/135 |
| 2001/0007568 A1 * | 7/2001 | Morris ........................ 370/473 |
| 2002/0101989 A1 * | 8/2002 | Markandey et al. ......... 380/210 |
| 2003/0103765 A1 * | 6/2003 | Sugahara et al. ............... 386/95 |
| 2003/0170008 A1 * | 9/2003 | Ohiro et al. .................. 386/111 |
| 2003/0231334 A1 * | 12/2003 | Nagai et al. ................ 358/1.14 |
| 2004/0001591 A1 * | 1/2004 | Mani et al. ................... 380/210 |
| 2004/0001592 A1 * | 1/2004 | Akiwumi-Assani et al. . 380/271 |
| 2004/0136696 A1 * | 7/2004 | Shiokawa et al. ............. 386/98 |

(Continued)

FOREIGN PATENT DOCUMENTS

CN  1313706 A  9/2001

(Continued)

OTHER PUBLICATIONS

Chinese Office Action dated Mar. 3, 2006.

Primary Examiner—Bhavesh M Mehta
Assistant Examiner—Sean Motsinger
(74) Attorney, Agent, or Firm—Cowan, Liebowitz & Latman, P.C.

(57) ABSTRACT

An image capture apparatus generates video data from captured images, and generates a video PES (packetized elementary stream) from the video data. The image capture apparatus converts the video PES into a MPEG-2 program stream, and converts the video PES into a MPEG-2 transport stream. The image capture apparatus records the MPEG-2 program stream on a random-access recording medium, and transmits the MPEG-2 transport stream to an external device. The conversion from the video PES into the MPEG-2 program stream and the conversion from the video PES into the MPEG-2 transport stream are performed in parallel thereby enabling the image capture apparatus to perform the recording of the MPEG-2 program stream and the transmission of the MPEG-2 transport stream in parallel.

8 Claims, 5 Drawing Sheets

U.S. PATENT DOCUMENTS

| | | | |
|---|---|---|---|
| 2004/0170162 A1* | 9/2004 | Hung | 370/389 |
| 2004/0240856 A1* | 12/2004 | Yahata et al. | 386/98 |
| 2004/0250273 A1* | 12/2004 | Swix et al. | 725/25 |
| 2005/0036757 A1* | 2/2005 | Romanowski et al. | 386/46 |

FOREIGN PATENT DOCUMENTS

| | | |
|---|---|---|
| CN | 1349715 A | 5/2002 |
| CN | 1349719 A | 5/2002 |
| JP | 11-045512 | 2/1999 |
| JP | 11069326 | 3/1999 |
| JP | 2000-138896 | 5/2000 |
| JP | 2001-016492 | 1/2001 |
| JP | 2001229614 | 8/2001 |
| JP | 2002344874 | 11/2002 |
| WO | WO 01/50761 | 7/2001 |
| WO | WO 01/50773 | 7/2001 |
| WO | WO 01/80773 | 11/2001 |
| WO | WO02/21829 | 3/2002 |

* cited by examiner

IMAGE CAPTURE APPARATUS

FIELD OF THE INVENTION

The present invention relates to an image capture apparatus, and more particularly, to an image capture apparatus such as a digital video camera.

BACKGROUND OF THE INVENTION

MPEG-2 Systems (see ISO/IEC 13818-1:2000, Information technology—Generic coding of moving pictures and associated audio information: Systems) prescribe PS (Program Stream; hereinafter "MPEG-2PS", TS (Transport Stream; hereinafter "MPEG-2TS") and PES (Packetized Elementary Stream).

In addition, for example, as described in Japanese Laid-Open Patent Publication No. 2000-138896, a recording apparatus having the capability to convert MPEG-2TS to MPEG-2PS and record the MPEG-2PS on a disk medium, as well as a recording apparatus having the capability to convert analog video signals and analog audio signals into MPEG-2PS and record the MPEG-2PS on a disk medium, have already been proposed.

Recent digital video cameras are required to have the following five capabilities:

(1) The ability to input and output MPEG-2TS and to record MPEG-2PS to, and to reproduce MPEG-2PS from, a random-access recording medium.

(2) The ability to generate MPEG-2PS and MPEG-2TS from captured images and input audio, and to record MPEG-2PS onto a random-access recording medium and to output MPEG-2TS to an external device.

(3) The ability to generate MPEG-2PS and MPEG-2TS from analog video signals and analog audio signals, and to record MPEG-2PS onto a random-access recording medium and to output MPEG-2TS to an external device.

(4) The ability to convert MPEG-2PS reproduced from a random-access recording medium into MPEG-2TS and output the MPEG-2TS to an external device.

(5) The ability to convert MPEG-2TS input from an external device into MPEG-2PS and record the MPEG-2PS onto a random-access recording medium.

However, no digital video camera having either one of these capabilities has been developed.

SUMMARY OF THE INVENTION

The present invention is conceived in consideration of the above-described conventional art, and has as its object to provide an image capture apparatus having at least one of the above-described capabilities.

According to an aspect of the present invention, there is provided an image capture apparatus comprising: input/output means for inputting and outputting an MPEG transport stream; recording/reproduction means for recording/reproducing an MPEG-2 program stream onto/from a random-access recording medium; and conversion means for converting the MPEG-2 transport stream into the MPEG-2 program stream, and converting the MPEG-2 program stream into the MPEG-2 transport stream.

According to another aspect of the present invention, there is provided an image capture apparatus comprising: program stream generating means for generating MPEG-2 program stream from a captured image and an input audio; transport stream generating means for generating MPEG-2 transport stream from the captured image and the input audio; and output means for outputting the MPEG-2 transport stream to an external device.

According to a further aspect of the present invention, there is provided an image capture apparatus comprising: program stream generating means for generating a MPEG-2 program stream from an analog video signal and an analog audio signal; transport stream generating means for generating a MPEG-2 transport stream from the analog video signal and the analog audio signal; and output means for outputting the MPEG-2 transport stream to an external device.

According to yet further aspect of the present invention, there is provided an image capture apparatus comprising: reproduction means for reproducing an MPEG-2 program stream from a random-access recording medium; conversion means for converting the MPEG-2 program stream into an MPEG-2 transport stream; and output means for outputting the MPEG-2 transport stream to an external device.

According to another aspect of the present invention, there is provided an image capture apparatus comprising: input means for inputting a MPEG-2 transport stream from an external device; conversion means for converting the MPEG-2 transport stream into a MPEG-2 program stream; and recording means for recording the MPEG-2 program stream onto a random-access recording medium.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments of the present invention will now be described in detail in accordance with the accompanying drawings. It should be noted that the present embodiment uses PS, TS and PES stipulated by the MPEG-2 Systems.

FIRST EMBODIMENT

Figure 1:
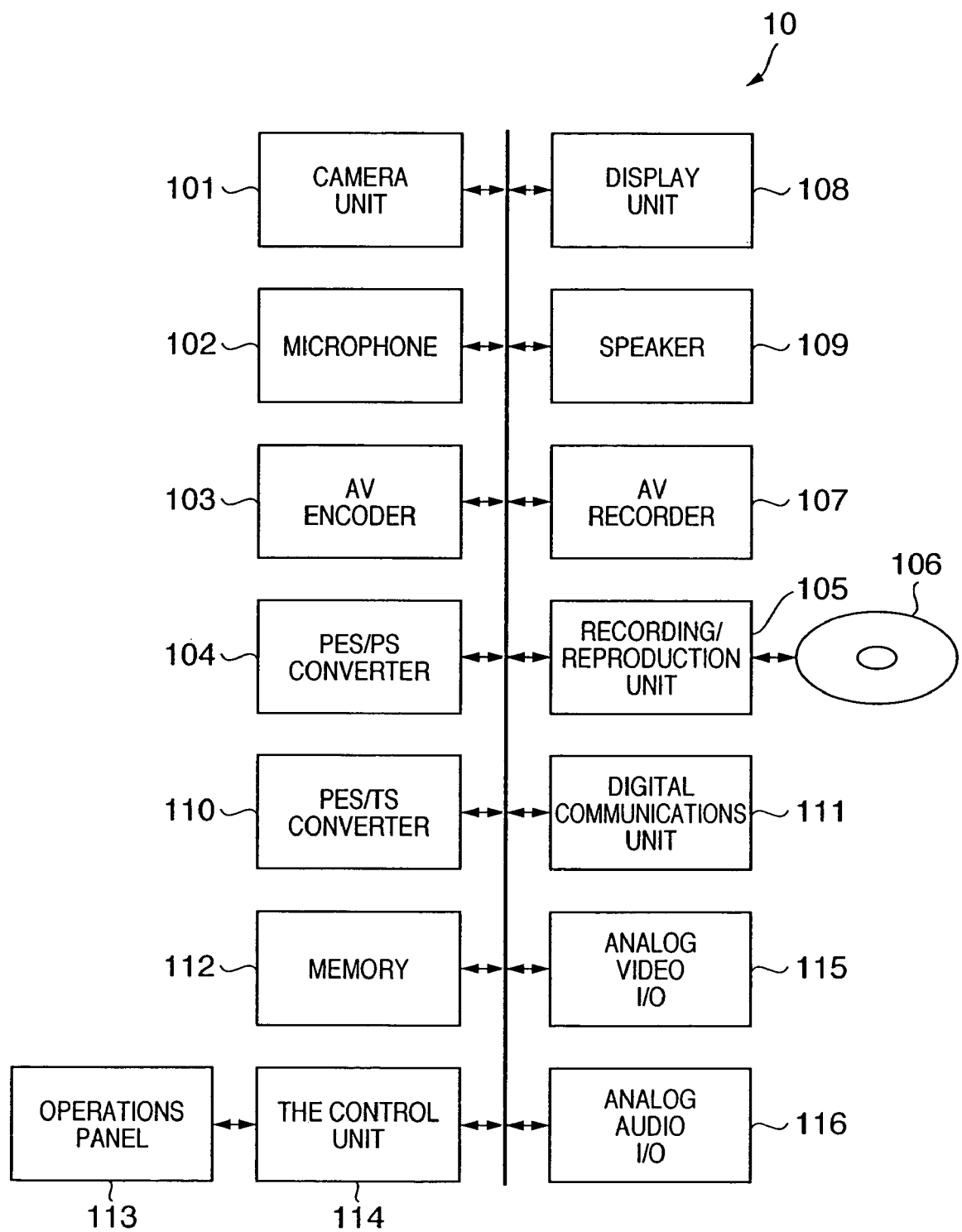
FIG. 1 is a block diagram showing essential components of a digital video camera (DVC) that is an image capture apparatus according to one embodiment of the present invention.

In order to facilitate an understanding of the present invention, a description is first given of the main component parts of a digital video camera (DVC) 10 that is an image capture apparatus according to one embodiment of the present embodiment, with reference to FIG. 1. As can be appreciated by those of ordinary skill in the art, the present invention can also be adapted to image capture apparatuses other than digital video cameras.

A camera unit 101, which generates video data from captured images, is comprised of an optical system including a lens, image capturing device and their associated control circuits. A microphone 102 generates audio data from input audio.

An AV encoder 103 encodes video data output from the camera unit 101 or an analog video I/O 115 as video ES (video Elementary Stream) and converts the video ES to video-use PES (hereinafter "video PES"). The AV encoder 103 also encodes audio data output from the microphone 102 or an analog audio I/O 116 as audio ES (audio Elementary Stream) and converts the audio ES into audio-use PES (hereinafter "audio PES").

It should be noted that the video encoding scheme used in generating video ES may, for example, be MPEG-2 Video (see ISO/IEC 13818-2: 2000, Information technology—Generic coding of moving pictures and associated audio information: Video). In addition, the audio encoding scheme used in generating audio ES may, for example, be MPEG-2 Audio BC (see ISO/IEC 13818-3: 1998, Information technology—Generic coding of moving pictures and associated audio information—Part 3: Audio), MPEG-2 Audio LSF (see ISO/IEC 13818-3: 1998), or MPEG-2 Audio AAC (see ISO/IEC 13818-7: 1997, Information technology—Generic coding of moving pictures and associated audio information—Part 7: Advanced Audio Coding (AAC)).

A PES/PS converter 104 converts video PES and audio PES output from the AV encoder 103 or the PES/TS converter 110 into MPEG-2PS (MPEG-2 program stream), and also converts the MPEG-2PS output from a recording/reproduction unit 105 into video PES and audio PES.

The recording/reproduction unit 105 records MPEG-2PS output from the PES/PS converter 104 onto a recording medium 106, and also reproduces MPEG-2PS designated by a control unit 114 from the recording medium 106. The recording medium 106 may be a random-access recording medium such as a disk, a semiconductor memory or the like.

An AV decoder 107 converts video PES output from the AV encoder 103 or the PES/PS converter 104 and decodes the video ES into video data. The AV decoder 107 also converts audio PES output from the AV encoder 103 or the PES/PS converter 104 into audio ES, and decodes the audio ES into audio data.

A display unit 108 displays video data output from the camera unit 101 or the AV decoder 107, and is comprised of a display device such as an LCD, for example. A speaker 109 outputs audio data output from the microphone 102 or the AV decoder 107.

A PES/TS converter 110 converts video PES and audio PES output from the AV encoder 103 or the PES/PS converter 104 into MPEG-2TS, and converts MPEG-2TS output from a digital communications unit 111 into video PES and audio PES.

The digital communications unit 111 outputs MPEG-2TS output from the PES/TS converter 110 to an external device, and inputs MPEG-2TS from an external device. It should be noted that the digital communications unit 111 may, for example, conform to IEEE 1394 standard (including IEEE 1394-1995, IEEE 1394a-2000 and extensions thereof) or USB standard (including USB 2.0 standard and extensions thereof).

A memory 112 stores a play list that the control unit 114 generates according to user instructions. A play list is a list that specifies how a plurality of MPEG-2PS recorded on the recording medium 106 are to be reproduced. For example, with a play list it is possible to specify a reproduction sequence or order for a plurality of MPEG-2PS and a reproduction starting point and a reproduction ending point for each of the MPEG-2PS.

An operations panel 113 sends user instructions to the control unit 114 and comprises a variety of input devices such as buttons, keys, touch panels and jog dials are used as appropriate. The control unit 114 controls the functions of the DVC 10.

The analog video I/O 115 converts analog video signals input from an external source into video data, and converts video data output from the camera unit 101 and the AV decoder 106 into analog video signals and outputs the analog video signals to an external device.

The analog audio I/O 116 converts analog audio signals input from an external device into audio data, and converts audio data input from the microphone 102 or the AV decoder 106 into analog audio signals and outputs the analog audio signals to an external device.

(1) Camera Mode

Figure 2:
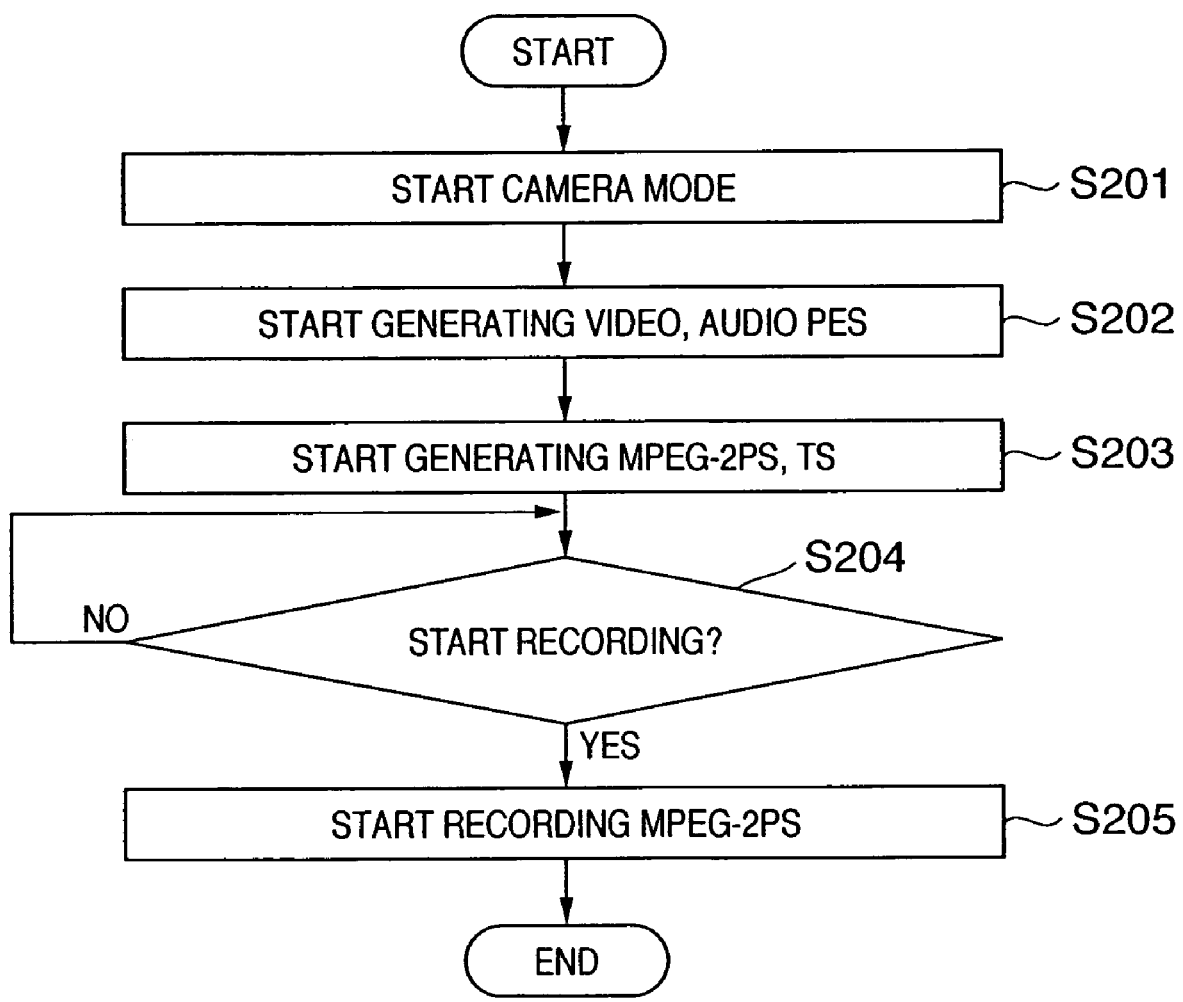
FIG. 2 is a flow chart illustrating an example of the operation of a DVC when the DVC is in a camera mode.

Next, a description is given of an example of operations of a DVC 10 when the DVC 10 is in a camera mode, with reference to the flow chart in FIG. 2.

In a step S201, when a user uses the operations panel 113 to turn the camera mode on, the control unit 114 reports the start of the camera mode to the components. In response to such notification, the components start predetermined operations. In other words, the camera unit 101 starts to generate video data from captured images and the microphone 102 starts to generate audio data from input audio. The display unit 108 starts to display video data output from the camera unit 101. The speaker 109 starts to output audio data output from the microphone 102. The analog video I/O 115 starts to convert video data output from the camera unit 101 into analog video signals and outputs the analog video signals to an external device. The analog audio I/O 116 starts to convert audio data output from the microphone 102 into analog audio signals and outputs the analog audio signals to an external device.

In a step S202, the AV encoder 103 starts to encode video data output from the camera unit 101 as video ES and convert the video ES into video PES. At the same time, the AV encoder 103 starts to encode audio data output from the microphone 102 as audio ES and convert the audio ES into audio PES.

In a step S203, the PES/PS converter 104 starts to convert the video PES and the audio PES output from the AV encoder 103 into MPEG-2PS. At the same time, the PES/TS converter 110 starts to convert the video PES and the audio PES output from the AV encoder 103 into MPEG-2TS. That is, the DVC 10 can simultaneously generate MPEG-2PS and MPEG-2TS from the captured images and the input audio. The digital communications unit 111 starts to output MPEG-2TS output from the PES/TS converter 110 to an external device. The recording/reproduction unit 105 waits to record MPEG-2PS onto the recording medium 106 until there is an instruction to start recording.

In a step S204, the control unit 114 determines whether or not an instruction to start recording has been issued by determining, for example, whether or not a REC button (that is, a recording start/stop button) on the operations panel 113 has been pressed. Processing proceeds to a step S205 if it is detected that the REC button has been pressed.

In a step S205, the control unit 114 sends an instruction to start recording to the recording/reproduction unit 105. The recording/reproduction unit 105 starts to record the MPEG-2PS output from the PES/PS converter 104 to the recording medium 106.

Thus, a DVC 10 according to this embodiment can generate MPEG-2TS and MPEG-2PS from the captured image and the input audio, and output the generated MPEG-2TS to an external device and output the generated MPEG-2PS to the recording medium 106.

In addition, the DVC 10 according to this embodiment can simultaneously generate MPEG-2PS from captured images and input audio and MPEG-2TS from captured images and input audio.

(2) Digital Output Mode

Figure 3:
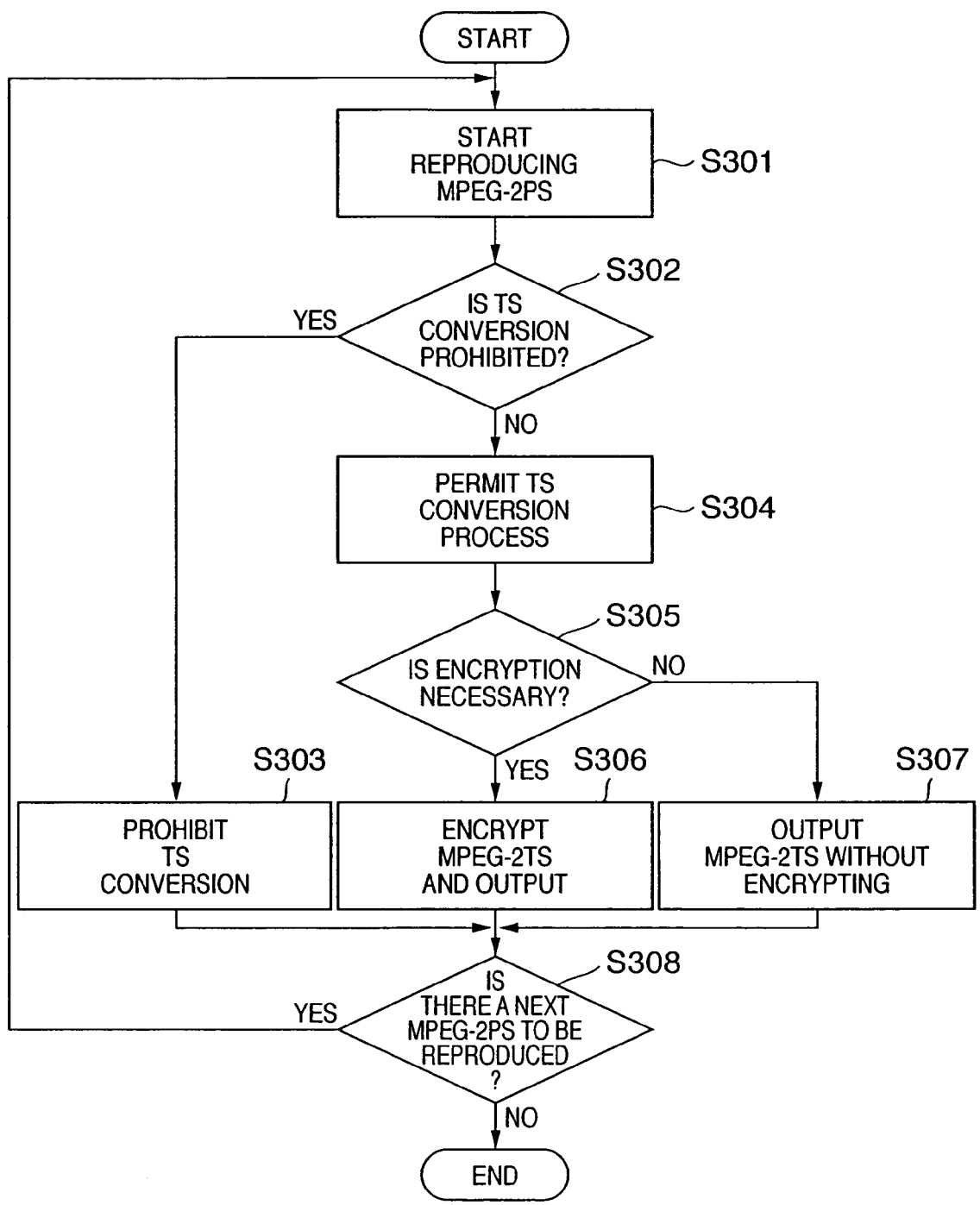
FIG. 3 is a flow chart illustrating an example of the operation of a DVC when the DVC is in a digital output mode.

Next, a description is given of the operations of the DVC 10 when the DVC 10 is in a digital output mode, with reference to the flow chart of FIG. 3.

In a step S301, when a user uses the operations panel 113 to turn the digital output mode on, the control unit 114 reports the start of the digital output mode to the components. The control unit 114 selects the MPEG-2PS to be reproduced in accordance with a user instruction or a play list, and notifies the selected MPEG-2PS to the recording/reproduction unit 105. The recording/reproduction unit 105 reproduces the MPEG-2PS designated by the control unit 114 at normal speed from the recording medium 106. The PES/PS converter 104 converts the MPEG-2PS output from the recording/reproduction unit 105 into video PES and audio PES. The AV decoder 106 converts video PES output from the PES/PS converter 104 to video ES and starts to decode the video ES into video data, and at the same time converts the audio PES output from the PES/PS converter 104 into audio ES and starts decoding the audio ES into audio data. The display unit 108 starts to display video data output from the AV decoder 106. The speaker 109 starts to output audio data output from the AV decoder 106. The analog video I/O 115 starts to convert video data output from the AV decoder 106 into analog video signals and output the analog video signals to an external device. The analog audio I/O 116 starts to convert audio data output from the AV decoder 106 into analog audio signals and output the analog audio signals to an external device.

In a step S302, the control unit 114 determines whether or not to prohibit TS conversion (that is, converting MPEG-2PS into MPEG-2TS). In this embodiment, TS conversion of MEPG-2PS is prohibited when attribute information prohibiting the TS conversion is attached to the MPEG-2PS output from the recording/reproduction unit 105. If TS conversion is prohibited, then processing proceeds to a step S303. If TS conversion is not prohibited, then processing proceeds to a step S304.

In step S303 the control unit 114 prohibits TS conversion. In such a case, the DVC 10 outputs a null packet (that is, a packet without a payload, or a packet of which payload contains invalid data) from the digital communications unit 111.

In step S304, the control unit 114 permits TS conversion.

In a step S305, the control unit 114 determines whether or not to execute encryption (that is, to encrypt MPEG-2TS) and sends the results of that determination to the PES/TS converter 110. In this embodiment, the control unit 114 determines to execute encryption if attribute information that requests encryption is attached to the MPEG-2PS output from the recording/reproduction unit 105. If encryption is to be executed, then processing proceeds to a step S306. If encryption is not to be executed, then processing proceeds to a step S307.

In step S306, the PES/TS converter 110 starts to convert video PES and audio PES output from the PES/PS converter 104 into MPEG-2TS, and at the same time starts to encrypt the MPEG-2TS payload. The digital communications unit 111 starts to output the MPEG-2TS encrypted by the PES/TS converter 110 to an external device.

In step S307, the PES/TS converter 110 starts to convert the video PES and the audio PES output from the PES/PS converter 104 into MPEG-2TS. Here, the MPEG-2TS payload is not encrypted. The digital communications unit 111 starts to output the MPEG-2TS output from the PES/TS converter 110 to an external device.

In a step S308, the control unit 114 determines whether or not there is an MPEG-2PS to be reproduced next. If the user specifies an MPEG-2PS to be reproduced next, or if there is still MPEG-2PS to be reproduced on the play list, then the control unit 114 determines that there is MPEG-2PS to be reproduced next, in which case the process returns to step S301.

Thus, the DVC 10 according to the present embodiment can convert MPEG-2PS reproduced from the recording medium 106 into MPEG-2TS according to a user instruction or a play list and output the MPEG-2TS to an external device.

In addition, the DVC 10 according to this embodiment, when TS conversion of the MPEG-2PS reproduced from the recording medium 106 is prohibited, thus the conversion of that MPEG-2PS into MPEG-2TS can be prohibited. In this case, the DVC 10 can output a null packet (that is, a packet without a payload or a packet of which payload contains invalid data) from the digital communications unit 111.

In addition, the DVC 10 according to the embodiment described above can encrypt and output MPEG-2TS.

It should be noted that the DVC 10 according to this embodiment can reproduce the MPEG-2PS fast or slow. In this case, the PES/TS converter 110 may convert video PES, obtained either at intervals or repeatedly, into MPEG-2TS, or, alternatively, I pictures may be extracted from the MPEG-2PS obtained either at intervals or repeatedly and MPEG-2TS may be generated from the extracted I pictures.

(3) Digital Input Mode

Figure 4:
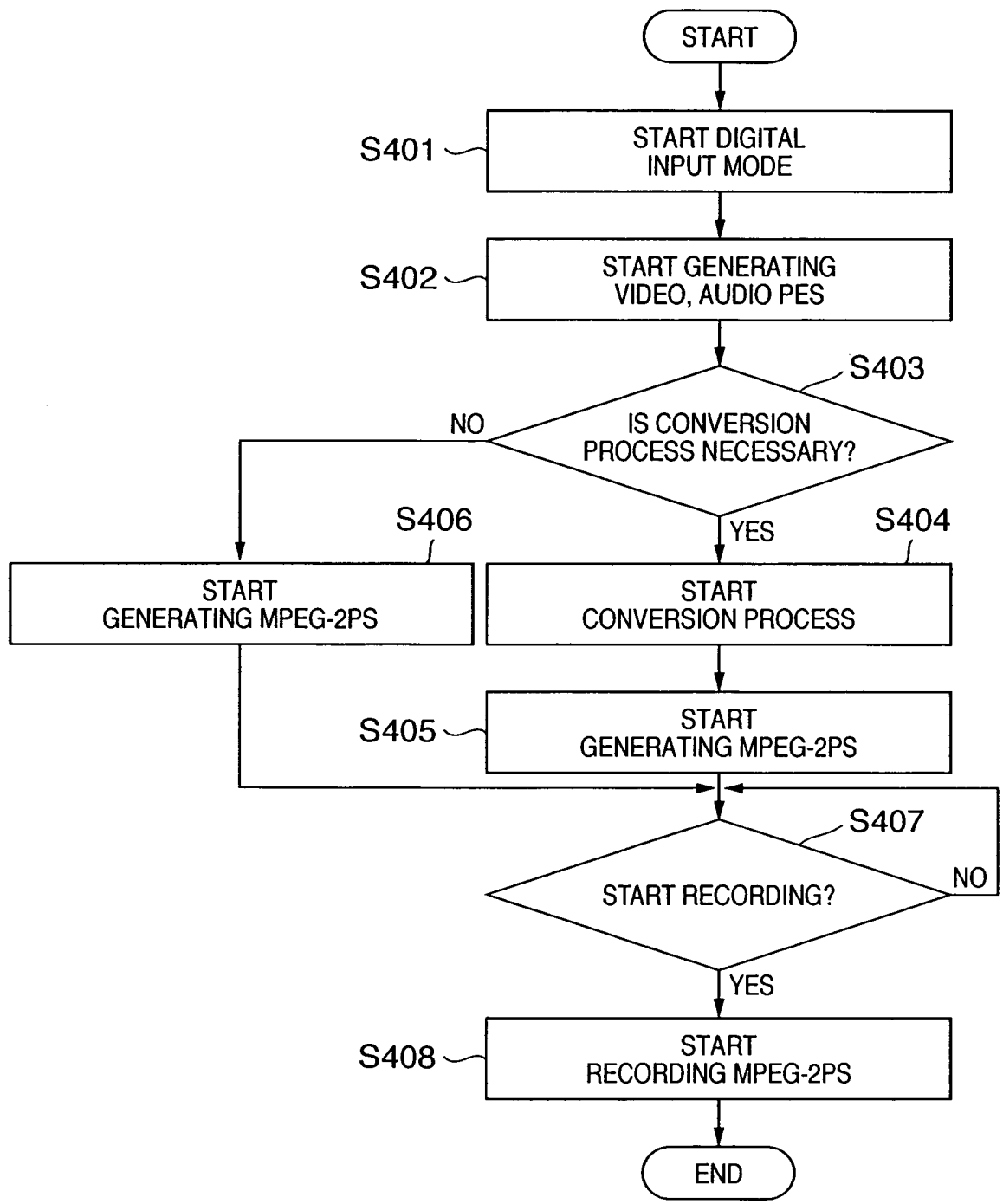
FIG. 4 is a flow chart illustrating an example of the operation of a DVC when the DVC is in a digital input mode.

Next, a description is given of the operation of the DVC 10 when the DVC 10 is in a digital input mode, with reference to the flow chart of FIG. 4.

In a step S401, when the user uses the operations panel 113 to turn the digital input mode on, the control unit 114 reports the start of the digital input mode to the component parts. The digital communications unit 111 starts to input the MPEG-2TS selected by the user from an external device.

In a step S402, the PES/TS converter 110 starts to convert the MPEG-2TS output from the digital communications unit 111 into video PES and audio PES. The AV decoder 107 starts to convert the video PES output from the PES/TS converter 110 into video ES and decode that video ES into video data. In addition, the AV decoder 107 also starts to convert the audio PES output from the PES/TS converter 110 into audio ES and decode that audio ES into audio data. The display unit 108 starts to display the video data output from the AV decoder 107. The speaker 109 starts to output audio data output from the AV decoder 107. The analog video I/O 115 starts to convert video data output from the AV decoder 107 into analog video signals and output those analog video signals to an external unit. The analog audio I/O 116 starts to convert audio data output from the AV decoder 107 into analog audio signals and output those analog audio signals to an external device.

In a step S403, the control unit 114 determines whether or not it is necessary to change at least one of either the number of pixels (also called the resolution), the frame rate (that is, the number of frames per second), the compression rate, the sampling frequency or the audio coding method. In the present embodiment, if the user inputs to the DVC 10 an instruction to change at least one of a preset number of pixels, frame rate, compression rate, sampling frequency or audio coding method, the control unit 114 determines that a change is necessary and reports the content of the change to the AV decoder 107. If change is necessary, then processing proceeds to a step S404. If no change is necessary, then processing proceeds to a step S406.

In step S404, if it is necessary to change at least one of either the number of pixels, the frame rate or the compression rate, the AV decoder 107 starts to change at least one of the number of pixels, frame rate or compression rate of the video data in response to notification from the control unit 114. On the other hand, if it is necessary to change at least one of either the sampling frequency or the audio coding method, the AV decoder 107 starts to change at least one of the sampling frequency or the audio coding method. The AV encoder 103 starts to encode video data output form the AV decoder 107 to video ES and in turn the video ES to video PES. The AV encoder 103 also starts to encode audio data output from the AV decoder 107 to audio ES and in turn the audio ES to audio PES.

In a step S405, the PES/PS converter 104 starts to convert video PES and audio PES output from the AV encoder 103 into MPEG-2PS.

In step S406, the PES/ES converter 104 starts to convert video PES and audio PES output from the PES/TS converter 110 into MPEG-2PS.

In a step S407, the control unit 114 determines whether or not an instruction to start recording has been issued, for example, by determining whether or not the REC button has been pressed. If the control unit 114 detects that the REC button has been pressed, then processing proceeds to a step S408.

In step S408, the control unit 114 sends the instruction to start recording to the recording/reproduction unit 105. The recording/reproduction unit 105 starts to record the MPEG-2PS output from the PES/PS converter 104 onto the recording medium 106.

As described above, the DVC 10 according to the present embodiment can convert MPEG-2TS input from an external device into MPEG-2PS and records the MPEG-2PS on a recording medium 106.

In addition, the DVC 10 according to the present embodiment can change the number of pixels, frame rate and compression rate of the video data obtained from the MPEG-2TS when converting MPEG-2TS into MPEG-2PS and recording the MPEG-2PS onto the recording medium 106. For example, the DVC 10 can change the number of pixels from 1920×1080 pixels to 720×480 pixels, and can change the frame rate from 60 Hz (60 frames/second) to 30 Hz (30 frames/second).

In addition, the DVC 10 according to the present embodiment can change the audio data sampling frequency and audio coding mode of the audio data obtained from the MPEG-2TS when converting the MPEG-2TS into MPEG-2PS, and recording the MPEG-2PS onto the recording medium 106. For example, the DVC 10 can change the sampling frequency from 48 kHz to 32 kHz, and can change the audio coding method from MPEG-2 Audio BC to MPEG-2 Audio AAC.

(4) Analog Input Mode

Figure 5:
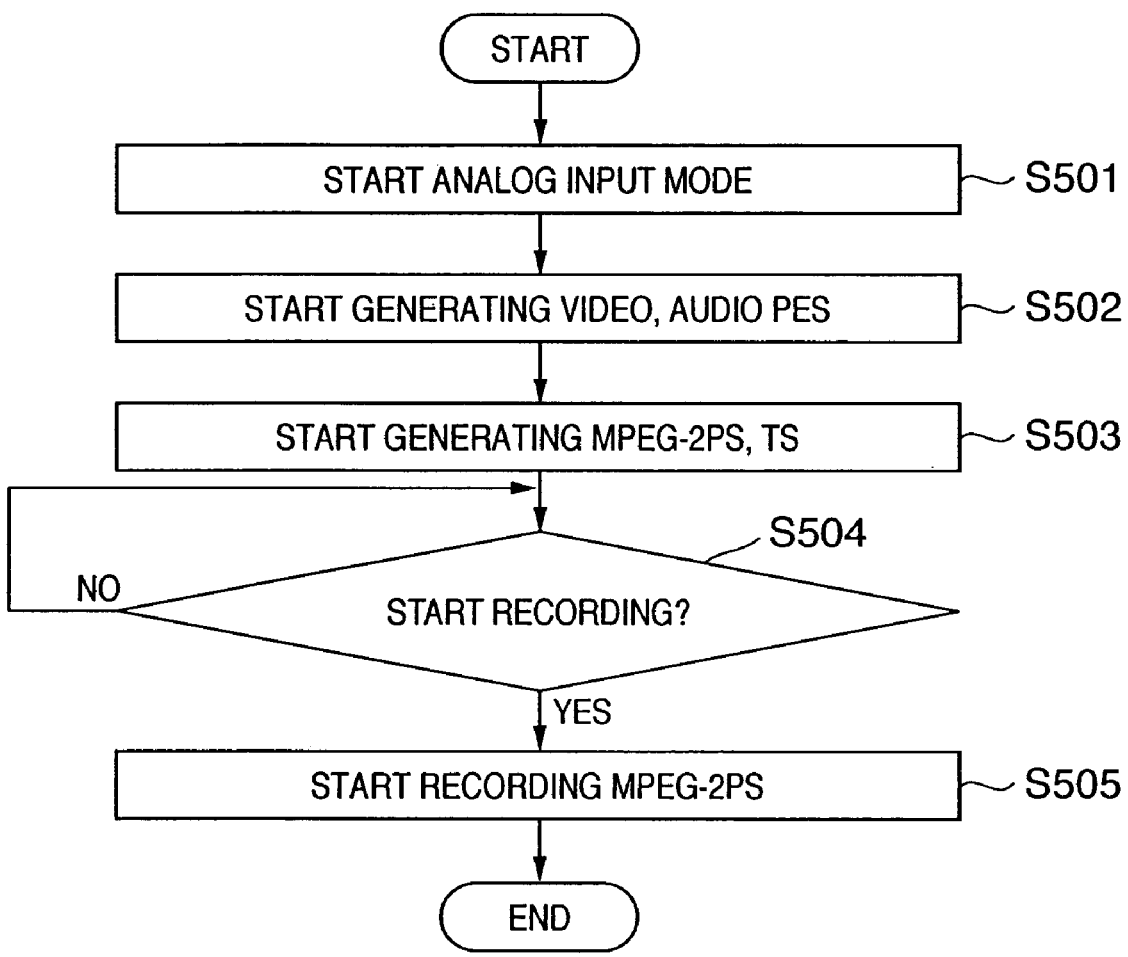
FIG. 5 is a flow chart illustrating an example of the operation of a DVC when the DVC is in an analog input mode.

Next, a description is given of the operation of a DVC 10 when the DVC 10 is in an analog input mode, with reference to the flow chart of FIG. 5.

In a step S501, when a user uses the operations panel 113 to turn the analog input mode on, the control unit 114 reports the start of the analog input mode to the components. The analog video I/O 115 starts to convert the analog video signals input from an external device into video data and output the video data to the AV encoder 103 and the display unit 108. The analog audio I/O 116 starts to convert the analog audio signals input from an external device into audio data and output the audio data to the AV encoder 103 and the speaker 109. The display unit 108 starts to display the video data output from the analog video I/O 115. The speaker 109 starts to output the audio data output from the analog audio I/O 116.

In a step S502, the AV encoder 103 starts to encode the video data output from the analog video I/O 115 as video ES and converts the video ES into video PES. At the same time, the AV encoder 103 starts to encode the audio data output from the analog audio I/O 116 as audio ES and convert that audio ES into audio PES.

In a step S503, the PES/PS converter 104 starts to convert the video PES and audio PES output from the AV encoder 103 into MPEG-2PS. On the other hand, the PES/TS converter 110 starts to convert the video PES and audio PES output from the AV encoder 103 into MPEG-2TS. That is, the DVC 10 can simultaneously generate MPEG-2PS as well as MPEG-2TS from the analog video signals and analog audio signals. The digital communications unit 111 starts to output MPEG-2TS output from the PES/TS converter 110 to an external device. The recording/reproduction unit 105 waits for an instruction to start recording to record the MPEG-2PS onto the recording medium 106.

In a step S504, the control unit 114 determines whether or not an instruction to start recording has been issued, for example by determining whether or not the REC button has been pressed. If the control unit 114 detects that the REC button has been pressed, then processing proceeds to a step S505.

In step S505, the control unit 114 reports the instruction to start recording to the recording/reproduction unit 105. The recording/reproduction unit 105 then starts to record the MPEG-2PS output from the PES/PS converter 104 onto the recording medium 106.

As described above, the DVC 10 according to the present embodiment can generate MPEG-2TS and MPEG-2PS from analog video signals and analog audio signals, and can output the generated MPEG-2TS to an external device and can record the generated MPEG-2PS to the recording medium 106.

In addition, the DVC 10 according to the present embodiment can simultaneously generate MPEG-2PS as well as MPEG-2TS from analog video signals and analog audio signals.

OTHER EMBODIMENTS

As can be appreciated by those of ordinary skill in the art, the present invention is not limited to the embodiment described above but can be adapted to other embodiments as well.

Thus, for example, the present invention may be adapted to an embodiment that combines a menu screen, warning mark or other image data with the video data prior to converting the video data output from the camera unit 101 or the AV decoder 107 into MPEG-2TS and outputting the MPEG-2TS to an external device.

According to the image capture apparatus of the above embodiments, it is possible to input and output MPEG-2TS, and record and reproduce MPEG-2PS.

In addition, according to the image capture apparatus of the above embodiments, it is possible to generate MPEG-2 program stream (PS) and MPEG-2 transport stream (TS) from captured images and input audio.

In addition, according to the image capture apparatus of the above embodiments, it is possible to generate MPEG-2 program stream and MPEG-2 transport stream from analog video signals and analog audio signals.

In addition, according to the image capture apparatus of the above embodiments, it is possible to convert an MPEG-2 program stream reproduced from a random-access recording medium into an MPEG-2 transport stream and output the MPEG-2 transport stream to an external device.

In addition, according to the image capture apparatus of the above embodiments, it is possible to convert an MPEG-2 transport stream input from an external device into an MPEG-2 program stream and record the MPEG-2 program stream onto a random-access recording medium 106.

As many apparently widely different embodiments of the present invention can be made without departing from the spirit and scope thereof, it is to be understood that the invention is not limited to the specific embodiments thereof except as defined in the appended claims.

What is claimed is:

1. An image capture apparatus comprising:
    a camera unit that generates video data from captured images;
    a video PES (packetized elementary stream) generating unit that generates a video PES from the video data generated by the camera unit;
    a first conversion unit that converts the video PES into a MPEG-2 program stream in a first mode;
    a second conversion unit that converts the video PES into a MPEG-2 transport stream in the first mode;
    a recording unit that records the MPEG-2 program stream on a random-access recording medium in the first mode;
    a communication unit that transmits the MPEG-2 transport stream to an external device in the first mode, and receives the MPEG-2 transport stream from the external device in a second mode, wherein a mode change between the first and second modes is initiated by a user of the image capture apparatus;
    a conversion determination unit that determines, according to a user instruction, whether a change of at least one of a preset number of pixels and frame rate of the received MPEG-2 transport stream is necessary in the second mode; and
    a decoding unit that decodes the received MPEG-2 transport stream into decoded video data, and changes at least one of the present number of pixels and frame rate of the decoded video data according to the user instruction in the second mode based on the determination result of the conversion determination unit,
    wherein, if the conversion determination unit determines that the change is necessary in the second mode:
    the decoding unit decodes the received MPEG-2 transport stream and changes at least one of the preset number of pixels and frame rate of the decoded video data;
    the video PES generating unit generates the video PES from the decoded video data of which at least one of the preset number of pixels and frame rate has been changed by the decoding unit; and
    the first conversion unit converts the video PES generated from the decoded video data into the MPEG-2 program stream enabling the recording unit to record the converted MPEG-2 program stream on the random-access recording medium, and
    wherein, if the conversion determination unit determines that the change is not necessary in the second mode:
    the second conversion unit inversely-converts the received MPEG-2 transport stream into the converted video PES, and the first conversion unit directly converts the converted video PES into the MPEG-2 program stream without decoding the converted video PES enabling the recording unit to record the converted MPEG-2 program stream on the random-access recording medium.

2. An image capture apparatus comprising:
    a camera unit that generates first video data from captured images;
    a video signal input unit that generates second video data from an analog video signal input from an external source;
    a video PES (packetized elementary stream) generating unit that generates a video PES from one of the first video data and the second video data;
    a first conversion unit that converts the video PES into a MPEG-2 program stream in a first mode;
    a second conversion unit that converts the video PES into a MPEG-2 transport stream in the first mode;
    a recording unit that records the MPEG-2 program stream on a random-access recording medium in the first mode;
    a communication unit that transmits the MPEG-2 transport stream to an external device in the first mode, and receives the MPEG-2 transport stream from the external device in a second mode, wherein a mode change between the first and second modes is initiated by a user of the image capture apparatus;
    a conversion determination unit that determines, according to a user instruction, whether a change of at least one of a preset number of pixels and frame rate of the received MPEG-2 transport stream is necessary in the second mode; and
    a decoding unit that decodes the received MPEG-2 transport stream into decoded video data, and changes at least one of the preset number of pixels and frame rate of the decoded video data according to the user instruction in the second mode based on the determination result of the conversion determination unit,
    wherein, if the conversion determination unit determines that the change is necessary in the second mode:
    the decoding unit decodes the received MPEG-2 transport stream and changes at least one of the preset number of pixels and frame rate of the decoded video data;
    the video PES generating unit generates the video PES from the decoded video data of which at least one of the preset number of pixels and frame rate has been changed by the decoding unit; and
    the first conversion unit converts the video PES generated from the decoded video data into the MPEG-2 program stream enabling the recording unit to record the converted MPEG-2 program stream on the random-access recording medium, and
    wherein, if the conversion determination unit determines that the change is not necessary in the second mode:
    the second conversion unit inversely-converts the received MPEG-2 transport stream into the converted video PES, and the first conversion unit directly converts the converted video PES in the MPEG-2 program stream without decoding the converted video PES enabling the recording unit to record the converted MPEG-2 program stream on the random-access recording medium.

3. The image capture apparatus according to claim 1, wherein the MPEG-2 program stream and the MPEG-2 transport stream conform to ISO/IEC 13818-1:2000 standard.

4. The image capture apparatus according to claim 2, wherein the MPEG-2 program stream and the MPEG-2 transport stream conform to ISO/IEC 13818-1:2000 standard.

5. The image capture apparatus according to claim 1, further comprising:
   a reproduction unit that reproduces the MPEG-2 program stream from the random-access recording medium,
   wherein the first conversion unit converts the MPEG-2 program stream reproduced from the random-access recording medium into a video PES,
   wherein the second conversion unit converts the video PES generated by the first conversion unit into a MPEG-2 transport stream, and
   wherein the communication unit transmits the MPEG-2 transport stream generated by the second conversion unit to an external device.

6. The image capture apparatus according to claim 1, wherein the image capture apparatus is a digital video camera.

7. The image capture apparatus according to claim 2, further comprising:
   a reproduction unit that reproduces the MPEG-2 program stream from the random-access recording medium,
   wherein the first conversion unit converts the MPEG-2 program stream reproduced from the random-access recording medium into a video PES,
   wherein the second conversion unit converts the video PES generated by the first conversion unit into a MPEG-2 transport stream, and
   wherein the communication unit transmits the MPEG-2 transport stream generated by the second conversion unit to an external device.

8. The image capture apparatus according to claim 2, wherein the image capture apparatus is a digital video camera.

* * * * *